Figure 1:
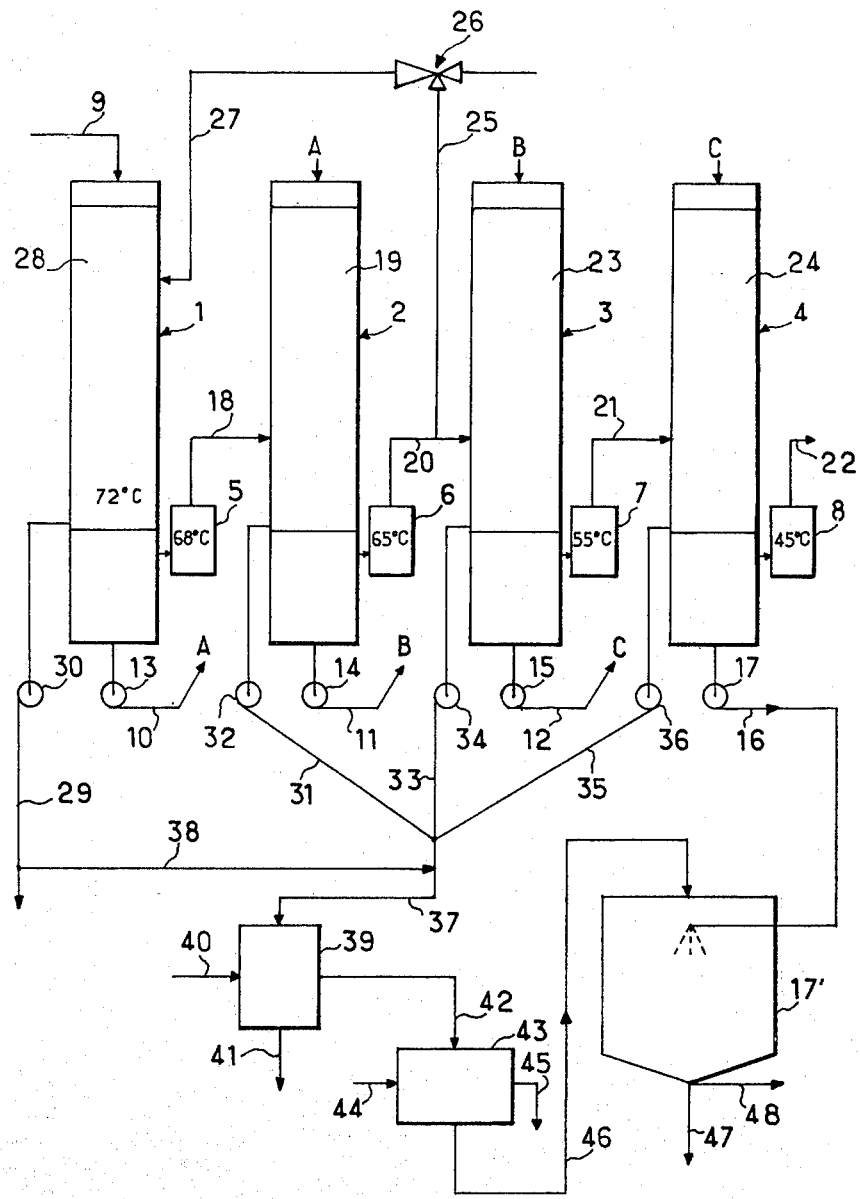

United States Patent [19]

Ciboit et al.

[11] 4,313,787
[45] Feb. 2, 1982

[54] METHOD FOR PREHEATING THE AIR CIRCULATING IN AN INSTALLATION COMPRISING AN EVAPORATOR COUPLED TO A DRYING UNIT

[75] Inventors: Jacques J. Ciboit, Paris; Eric C. Pradines, Versailles, both of France

[73] Assignee: Laguilharre S.A., Nanterre, France

[21] Appl. No.: 171,295

[22] Filed: Jul. 23, 1980

[30] Foreign Application Priority Data

Aug. 3, 1979 [LU] Luxembourg ............................ 81573

[51] Int. Cl.³ .......................... B01D 1/16; B01D 1/26
[52] U.S. Cl. .............................. 159/48 R; 159/17 VS; 159/4 MS; 159/DIG. 8
[58] Field of Search ............. 159/17 A, 17 VS, 4 MS, 159/4 VM, 4 A, DIG. 8, 47, 48

[56] References Cited

U.S. PATENT DOCUMENTS 2,310,650  2/1943  Peebles ........................... 159/4 VM
3,185,580  5/1965  Hanrahan et al. ............... 159/4 VM
3,354,932  11/1967 Hesler et al. ..................... 159/17 R
3,392,089  7/1968  Guptill, Jr. et al. .......... 159/DIG. 8
3,489,654  1/1970  Geiringer ........................ 159/DIG. 8

Primary Examiner—Norman Yudkoff
Attorney, Agent, or Firm—Birch, Stewart, Kolasch & Birch

[57] ABSTRACT

A method for preheating the air circulating and used in an installation comprising a multi-stage evaporator adapted to concentrate a liquid product, in particular a food product such as a milk product, on the one hand, and a drying unit in which is processed and concentrate issuing from said evaporator, or any other concentrate, on the other hand, said method comprising the steps of heating condensates of said multi-stage evaporator by means of a fluid issuing from said evaporator and hotter than said condensates, then driving the thus-heated condensates into a heat-exchanger wherein they cause air to be preheated.

10 Claims, 5 Drawing Figures

METHOD FOR PREHEATING THE AIR CIRCULATING IN AN INSTALLATION COMPRISING AN EVAPORATOR COUPLED TO A DRYING UNIT

The present invention relates to a method for preheating the air circulated and used in an installation comprising a multi-stage evaporator adapted to concentrate a liquid product, in particular a food product such as a milk product, on the one hand, and a drying unit in which is processed the concentrate issuing from said evaporator, or any other concentrate, on the other hand.

Preferably, the air to be preheated shall be the air required for the drying unit, constituted mainly by a hot air actuated dryer, eg. an atomizer-dryer.

Prior-art methods of that type usually comprise extracting the condensates of the evaporator last stage, then driving said condensates into a heat-exchanger in which they cause a certain amount of air to be preheated, said air being subsequently raised to the desired ultimate temperature in a heater. Said condensates, however, are at a relatively low temperature and, accordingly provide but a poor preheating, so that the desired ultimate temperature can be reached in the ultimate heater only with a high consumption of energy, which is uneconomical.

The object of the present invention is precisely to obviate such a drawback and, to that end, it provides a method characterized in that it comprises, first, heating condensates of the multi-stage evaporator by means of a fluid issuing from said evaporator and at a higher temperature than said condensates, then carrying the thus-heated condensates into a heat-exchanger wherein they cause air to be pre-heated.

The thus-heated condensates comprise the whole, or a part of, the condensates of an evaporator stage, or a mixture of condensates issuing from several stages of said evaporator.

It is thus possible, through the use of low-cost calories issuing from the evaporator, to obtain condensates and, therefore, a water at a higher temperature than that of those condensates issuing from the last stage of said evaporator. The power expense in the ultimate heater will therefore be all the smaller.

The fluid by means of which is achieved the heating step is constituted by hotter condensates issuing from the evaporator. The heating step can thus be achieved within the evaporator, that is within a stage. However, said heating step can also be achieved outside the evaporator, eg. in a mixture tank in which the colder condensates are combined with the hotter ones.

According to a variant, the heated condensates, prior to being brought into the heat exchanger, are admixed with vapour issuing from the evaporator, said vapour being hotter than said heated condensates. The condensates ultimately obtained according to said variant, or those condensates simply heated by means of hotter condensates, can subsequently, if desired, and prior to being brought into the heat exchanger, be mixed again with other condensates at higher temperature.

It has been specified hereabove that the heating fluid is constituted by condensates issuing from the evaporator. However, said fluid might be just as well constituted by a hotter vapour issuing from the evaporator.

Such an operation can be achieved within the evaporator. In such a case, the condensates to be heated shall be introduced into a hotter stage in which they will be in the presence of vapour generated in a previous stage. Such an operation can also be achieved outside the evaporator, eg. in a condensor in which takes place a thorough mixture of those condensates to be heated and of the vapour generated in a stage of said evaporator.

The condensates thus heated by vapour, if desired and prior to being introduced into the heat exchanger, can be subsequently admixed with other condensates, either hotter or at the same temperature.

Figure 2:
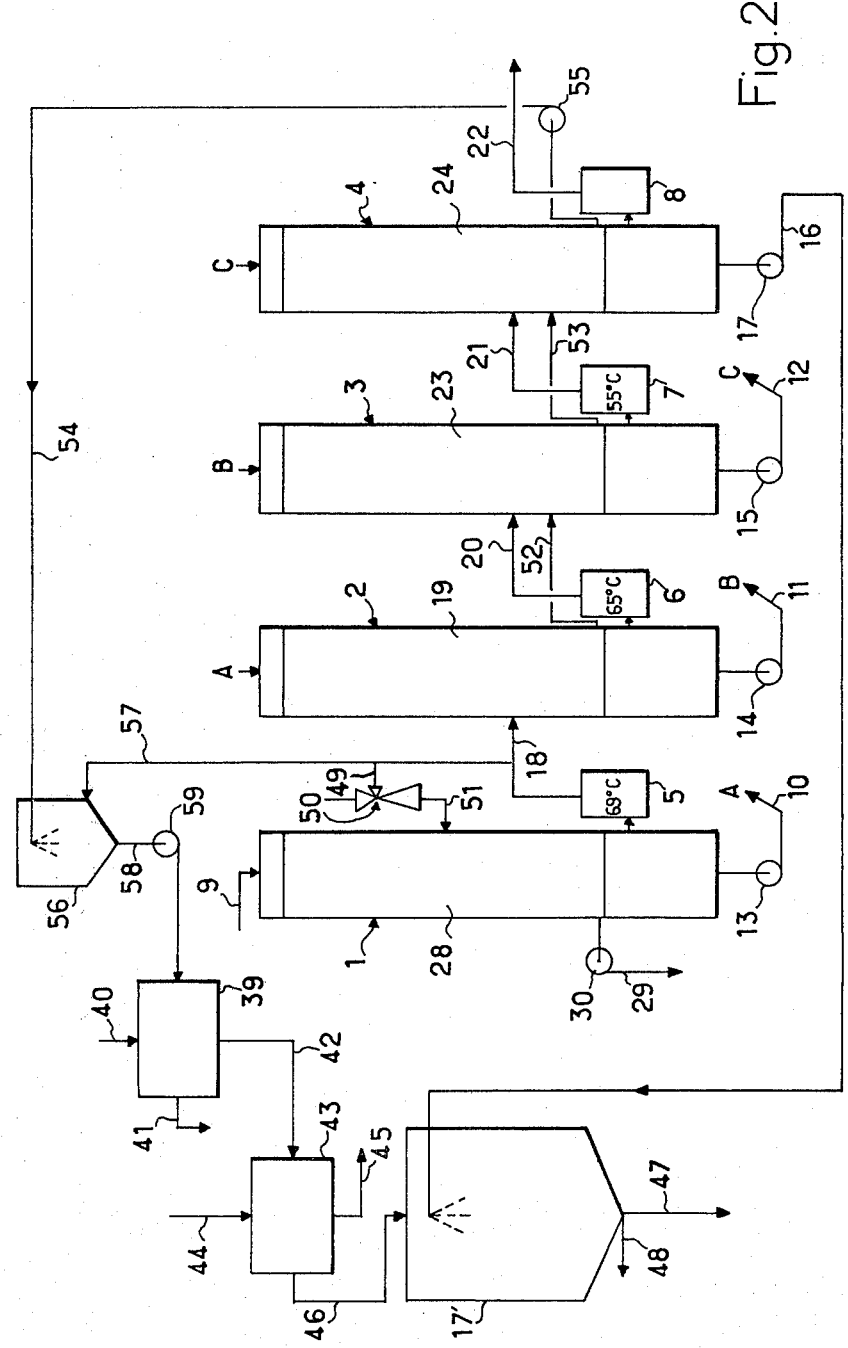
Figure 3:
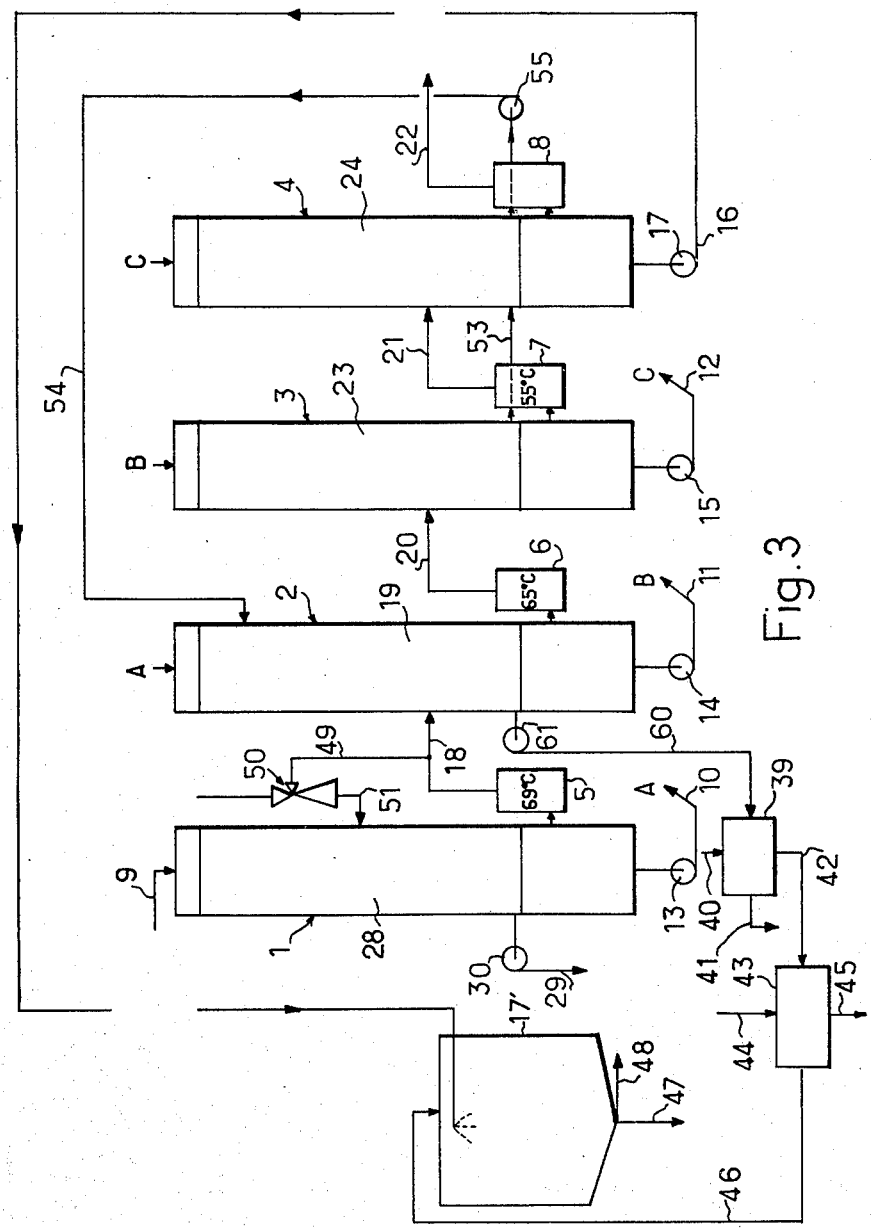
Figure 4:
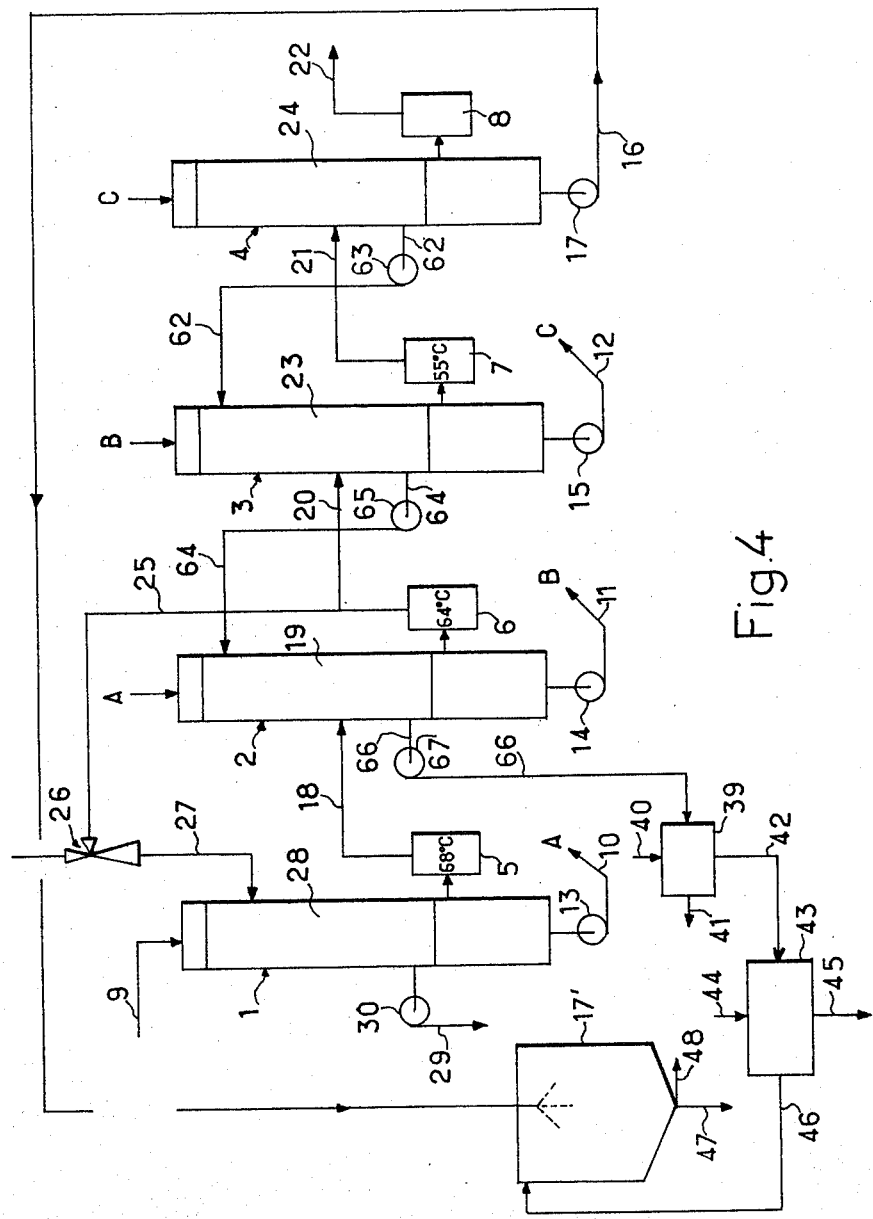

The present invention will be better illustrated with reference to the accompanying drawing, in which FIGS. 1 to 4 diagramatically represent an installation comprising a four-stage evaporator and in which the air to be preheated is adapted to be used in a hot air-actuated dryer, of the atomizer-dryer type, said preheating step being achieved by means of hot water obtained:

In the case of FIG. 1, through the mixture of the condensates of the last three stages of the evaporator, said mixture being made outside said evaporator;

In the case of FIG. 2, through heating of the last stage condensates, by means of the vapour formed in the first stage, such a heating step being achieved outside the evaporator;

In the case of FIG. 3, through heating of the last stage condensates, by means of the vapour formed in the first stage, such a heating step being achieved in the second stage, and, In the case of FIG. 4, by heating the condensates of any stage by means of vapour, said heating step being achieved in the previous stage.

Figure 5:
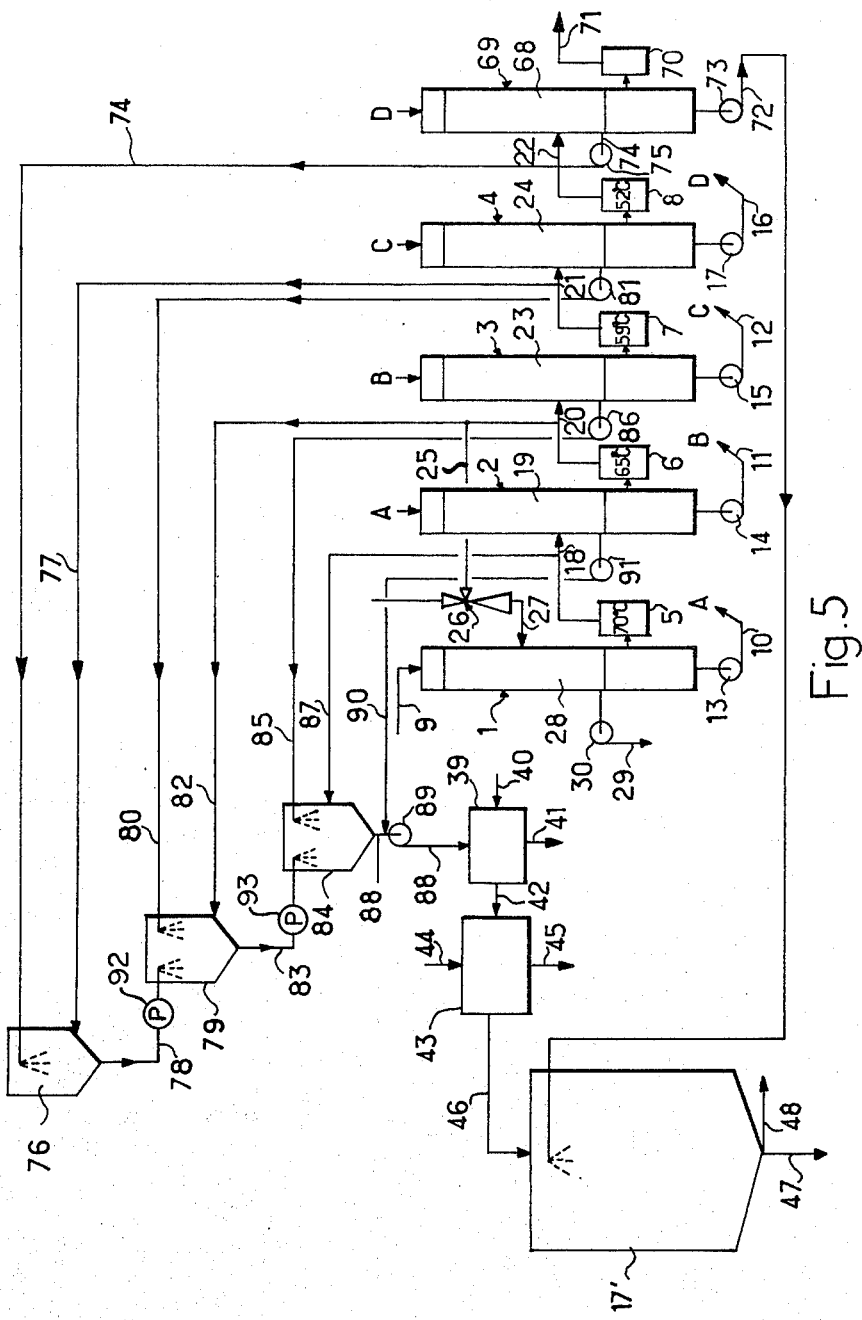

FIG. 5 diagramatically shows an installation comprising a five-stage evaporator in which the air to be preheated is adapted to be used in a hot air-actuated dryer, of the atomizer-dryer type, said preheating step being achieved by means of hot water obtained by heating the condensates of a stage by means of vapour at the same temperature as the condensates of the previous stage, said heating step being carried out outside the evaporator.

More specifically, FIG. 1 shows a four stage evaporator, the four stages being numbered 1, 2, 3, 4, and of the falling stream type. To these four stages are associated vapour-liquid separators 5, 6, 7, 8 respectively. The liquid product to be concentrated (skim milk, in the present instance), is brought through a duct line 9 at the top of the first stage 1, then from the bottom of said first stage 1 to the top A of the second stage 2, then from the bottom of said second stage 2 to the top B of the third stage 3, and finally from the bottom of said stage 3 to the top C of last stage 4, via ducts 10, 11, 12 respectively, utilizing circulating pumps 13, 14, 15, respectively. Finally, the condensed skim milk issuing from the bottom of last stage 4 is brought, via a duct 16 comprising a circulating pump 17, to the upper portion of an atomizer-dryer 17', duct 16 being provided, at the free end thereof, with an appropriate pulverisation device (not shown).

The vapour generated in first stage 1 flows through separator 5, via duct 18, reaching the heating body 19 of stage 2. Similarly, the vapours generated in stage 2, in stage 3 and in stage 4, respectively, circulate through separators 6, 7 and 8, respectively, and, via ducts 20, 21, 22 respectively, reach the heating body 23 of stage 3, the heating body 24 of stage 4 and a condensor (not shown), respectively. Duct 20 is bypassed by suction duct 25 of a thermocompressor 26, the exhaust duct 27 of which opens into heating body 28 of stage 1. It is to be noted that the pressure gradually decreases from the first to the last stage.

At the bottom of heating body 28 is mounted an extraction duct 29 provided with an extraction pump 30 related to a boiler (not shown) in which is generated the vapour required for operating thermocompressor 26. Quite obviously, it would not be going beyond the scope of the present invention to extract only a portion of the condensates of stage 1 from heating body 28, the remaining portion being driven into the heating body 19 of stage 2.

As for those condensates generated in heating bodies 19, 23 and 24, they are extracted through a duct 31 carrying an extraction pump 32, through a duct 33 carrying an extraction pump 34 and through a duct 35 carrying an extraction pump 36, respectively. Ducts 31, 33 and 35 are connected to a duct 37 bypassed by a duct 38 connected, in its turn, to duct 29. Said duct 37 opens into an indirect heat exchanger 39 in which the mixture of those condensates issuing from ducts 31, 33, 35 and 38 gives up its calories to the air brought into said heat exchanger via a duct 40, the cooled condensates being expelled from said heat exchanger via duct 41. The air, thus heated and issuing from said heat exchanger 39, is subsequently driven, through a duct 42, into a second indirect heat exchanger 43, wherein it is raised to the desired ultimate temperature, said second exchanger being fed with live vapour via a duct 44, those condensates issuing from said second exchanger being exhausted by a duct 45. Hot air issuing from exchanger 43 is brought, via duct 46, to the top of atomizer-dryer 17'. The concentrated skim milk brought via duct 16 and pulverized in atomizer-dryer 17' is called to dry by means of said hot air, whereby milk powder is obtained. The latter and the air are expelled, at the bottom of atomizer-dryer 17', through ducts 47 and 48 respectively. It is to be noted that said atomizer-dryer, if desired, can be used for processing a concentrate different from the one issuing from stage 4.

FIG. 2 shows an installation comprising members 1 to 24, 17', 28 to 30 and 39 to 48, similar to those of FIG. 1. Moreover, duct 18 is bypassed by suction duct 49 of a thermocompressor 50, the exhaust duct 51 of which opens into heating body 28 of stage 1. Those condensates present in the lower portion of heating body 19 are brought into heating body 23 via a duct 52. Similarly, those condensates collected at the bottom of heating body 23 are brought into heating body 24 via duct 53. Finally, those condensates collected at the bottom of heating body 24 are brought, via a duct 54 carrying a circulation pump 55, to the upper portion of a condenser 56 that is fed with vapour, in the lower portion thereof, through a duct 57 bypassing duct 49. Thus, the condensates of last stage 4 at a temperature of 55° C. are heated in said condenser 56, viz outside the evaporator, by means of vapour at a temperature of 69° C. generated in stage 1. These condensates thus raised to a temperature of 69° C. are exhausted, at the bottom of said condensor, via a duct 58 carrying an extraction pump 59 and they are driven into heat exchanger 39.

Variants of the above-disclosed installation might consist, eg. in heating those condensates driven into condenser 56 via duct 54, by means of the vapour at a temperature of 65° C. generated in stage 2, instead of the vapour generated in stage 1, or else in heating those condensates at a temperature of 65° C. present in stage 3, by sending the latter into condenser 66 in which the temperature thereof is raised to 69° C. by means of the vapour circulating in duct 57.

The installation as shown in FIG. 3 comprises members 1 to 24, 17', 28 to 30, 39 to 51 and 53 to 55, similar to those of FIG. 2 and arranged in the same way as in said FIG. 2, except for duct 54 that opens into the upper portion of heating body 19 of stage 2, instead of into a condensor. Thus the condensates of the last stage 4 is heated at the temperature of 55° C. by means of vapour at the temperature of 69° C. present in heating body 19, said condensates being finally raised to the temperature of said vapour. The thus-heated condensates are exhausted, at the bottom of heating body 19, via a duct 60 carrying an extraction pump 61 and opening into heat exchanger 39. A variant of said installation might consist, eg. in driving the condensates of last stage 4, at the temperature of 55° C., into the lower portion of heating body 19 instead of into the upper portion thereof, viz in direct contact with those condensates already present therein. Under such conditions, the condensates at a temperature of 55° C. usually do not stay in heating body 19 long enough for being raised to the temperature of said body (viz 69° C.). Another variant would consist in driving the condensates of last stage 4 into the upper (or lower) portion of heating body 23, instead of into the upper portion of heating body 19.

The installation as shown in FIG. 4 comprises members 1 to 30, 17' and 39 to 48 similar to those of FIG. 1 and arranged in the same way. Moreover, an extraction duct 62 related to the bottom of heating body 24 and carrying an extraction pump 63 drives those condensates at the temperature of 55° C. present in said heating body 24, into the upper portion of heating body 23, wherein they are heated up to a temperature of 64° C. Similarly, an extraction duct 64 related to the bottom of heating body 23 and carrying an extraction pump 65 drives those condensates at the temperature of 64° C. present in said heating body 23, into the upper portion of heating body 19 wherein, they are heated up to a temperature of 68° C., prior to being exhausted from said body via an extraction duct 66 carrying an extraction pump 67 and opening into heat exchanger 39.

The installation as shown in FIG. 5 comprises members 1 to 30, 17' and 39 to 48 similar to those of FIG. 1. Duct 22, however, instead of opening into a condensor as in the case of FIG. 1, reaches the heating body 68 of a fifth stage 69, the pressure in said fifth stage being lower than that in stage 4. The vapour generated in said fifth stage is circulated along a vapour-liquid separator 70 associated with said stage, prior to being sent, via a duct 71, into a condensor (not shown). Moreover, duct 16 drives the concentrated skim milk issuing from stage 4, not into atomizer-dryer 17', as in the case of the installation of FIG. 1, but to the top D of last stage 69; the concentrated skim milk issuing from the bottom of said stage 69 is driven, via a duct 72 comprising a pump 73, to the top of atomizer-dryer 17'. Those condensates collected in the lower portion of heating body 68 are carried, via a duct 74 provided with a circulating pump 75, into the upper portion of a condensor 76, into which opens also a duct 77 connected to duct 21. Thus, the condensates, at a temperature of 52° C., of last stage 69 are heated in said condensor 76 by vapour at a temperature of 59° C. generated in stage 3.

The thus-heated condensates are exhausted at the bottom of condensor 76, via a pump 92 and a duct 78 that reaches the upper portion of a second condensor 79, into the upper portion of which also opens a duct 80 provided with a circulating pump 81 and adapted to carry those condensates collected in the lower portion of heating body 24. Into said condensor 79 also opens a duct 82 connected to the duct 20. Those condensates, at a temperature of 59° C., issuing from ducts 78 and 80 are therefore heated in said condensor 79 by means of vapour, at a temperature of 65° C., generated in stage 2. These condensates are subsequently exhausted, at the bottom of condensor 79, via a pump 93 and a duct 83 that reaches the upper portion of a third condensor 84, into the upper portion of which also opens a duct 85 provided with a circulating pump 86, adapted to drive the condensates collected at the bottom of heating body 23. In addition, into said condensor 84 also opens a duct 87 connected to duct 18. Those condensates, at a temperature of 65° C., issuing from ducts 83 and 85 are therefore heated in condensor 84 by means of vapour, at a temperature of 70° C., generated in stage 1. Said condensates thus raised a temperature of 70° C. are subsequently exhausted at the bottom of said condensor 84, via a duct 80 provided with an extraction pump 89; into said duct 88 opens a duct 90 provided with a circulating pump 91 and carrying those condensates, at a temperature of 70° C., collected at the bottom of heating body 19. Finally, said duct 88 opens into heat exchanger 39.

What is claimed is:

1. In a method for concentrating a liquid product into a powdered product wherein said liquid product is treated in a multi-stage evaporator system to form a condensed concentrate product and a condensate and said condensed concentrate product is subsequently dried with hot air to produce a powdered product, the improvement which comprises heating the condensates of said multi-stage evaporator by means of a fluid issuing from said evaporator system to form a hot condensate and bringing said hot condensate issuing from said evaporator system into indirect heat exchange with air to form said hot air, said hot air being used to dry said condensed concentrate product.

2. The method according to claim 1, wherein said fluid comprises condensates.

3. The method according to claim 2 wherein, prior to being brought into said heat-exchanger relationship, said heated condensates are admixed with vapour issuing from said evaporator system to form hotter condensates.

4. The method according to any of claims 2 and 3, wherein, prior to being brought into said heat exchanger, the ultimately obtained condensates are admixed with hotter condensates.

5. The method according to claim 4, wherein said fluid comprises vapour.

6. The method according to claim 1, wherein, prior to being brought into said heat exchange relationship, said heated condensates are admixed with other condensates which are hotter than or at the same temperature as said heated condensates.

7. The method according to any of claims 2 and 5, wherein said heating step is carried out either in one of the evaporator stages, or outside said evaporator system.

8. The method according to any of claims 3 and 6, wherein said mixing is made either in one of the evaporator stages, or outside said evaporator system.

9. The method of claim 1 wherein the temperature of the hot air is further increased by bringing it into indirect heat exchange with hot vapor taken from the multi-stage evaporator system.

10. The method of claim 1 wherein the liquid product is a liquid milk product and the powdered product is a powdered milk product.

* * * * *